United States Patent
Forceville et al.

(10) Patent No.: US 12,445,866 B2
(45) Date of Patent: Oct. 14, 2025

(54) SELECTION AND OPTIMIZATION OF PREDICTION ALGORITHMS FOR 3GPP NETWORK DATA ANALYTICS FUNCTION (NWDAF)

(71) Applicant: Hewlett Packard Enterprise Development LP, Spring, TX (US)

(72) Inventors: Olivier Forceville, Isere (FR); Charlotte Aurianne Teetsov, Isere (FR)

(73) Assignee: Hewlett Packard Enterprise Development LP, Spring, TX (US)

( * ) Notice: Subject to any disclaimer, the term of this patent is extended or adjusted under 35 U.S.C. 154(b) by 474 days.

(21) Appl. No.: 18/053,147

(22) Filed: Nov. 7, 2022

(65) Prior Publication Data
US 2024/0040402 A1 Feb. 1, 2024

(30) Foreign Application Priority Data
Jul. 29, 2022 (EP) .................................... 22306139

(51) Int. Cl.
*H04W 24/02* (2009.01)
*H04L 41/147* (2022.01)

(52) U.S. Cl.
CPC .......... *H04W 24/02* (2013.01); *H04L 41/147* (2013.01)

(58) Field of Classification Search
CPC ............................. H04W 24/02; H04L 41/147
USPC ....................................................... 370/252
See application file for complete search history.

(56) References Cited

U.S. PATENT DOCUMENTS

| | | | |
|---|---|---|---|
| 10,986,579 B2 | 4/2021 | Han et al. | |
| 11,412,415 B2* | 8/2022 | Asawa | H04L 41/0806 |
| 2020/0112907 A1* | 4/2020 | Dao | H04M 15/8016 |
| 2021/0021494 A1* | 1/2021 | Yao | H04L 43/04 |
| 2021/0306887 A1 | 9/2021 | Kim et al. | |
| 2022/0225126 A1* | 7/2022 | Ma | H04W 24/02 |
| 2023/0156522 A1* | 5/2023 | Bashir | H04L 41/147 |
| | | | 370/329 |
| 2023/0275811 A1* | 8/2023 | Tamagnan | H04L 43/065 |
| | | | 709/224 |
| 2024/0146376 A1* | 5/2024 | Syed Muhammad | H04L 5/001 |
| 2024/0236208 A1* | 7/2024 | Bega | H04L 41/147 |
| 2024/0323125 A1* | 9/2024 | Kim | H04L 47/127 |

(Continued)

FOREIGN PATENT DOCUMENTS

| | | |
|---|---|---|
| WO | 2020/136512 A1 | 7/2020 |
| WO | 2020/147927 A1 | 7/2020 |

(Continued)

*Primary Examiner* — Nicholas R Taylor
*Assistant Examiner* — Chong G Kim
(74) *Attorney, Agent, or Firm* — Hewlett Packard Enterprise Patent Department

(57) ABSTRACT

Systems and methods are provided for executing NWDAF uses cases with a more optimal tradeoff between accuracy, latency, and resource consumption, to thereby improve upon network performance or services. For example, the systems and methods can provide smart NWDAF prediction optimization that includes grouping 3GPP subscription requests based on common attributes of analysis tasks, creating a single analysis prediction workload for each group of the analysis tasks, and selecting a forecasting algorithm for executing each single analysis prediction workload based on a prediction time window classification.

18 Claims, 11 Drawing Sheets

(56) References Cited

U.S. PATENT DOCUMENTS

| | | | | |
|---|---|---|---|---|
| 2024/0406761 A1* | 12/2024 | Wang | ................... | H04W 24/06 |
| 2025/0056472 A1* | 2/2025 | Karampatsis | ......... | G01S 5/0278 |
| 2025/0063431 A1* | 2/2025 | Ali | ..................... | H04W 36/362 |
| 2025/0106658 A1* | 3/2025 | Olvera-Hernandez | ...................... H04W 24/08 | |
| 2025/0126497 A1* | 4/2025 | Villasante Marcos | ...................... H04L 41/142 | |

FOREIGN PATENT DOCUMENTS

| | | |
|---|---|---|
| WO | 2020/253934 A1 | 12/2020 |
| WO | 2021/004859 A1 | 1/2021 |
| WO | 2021/019498 A1 | 2/2021 |
| WO | 2021/023388 A1 | 2/2021 |
| WO | 2021/028063 A1 | 2/2021 |

* cited by examiner

SELECTION AND OPTIMIZATION OF PREDICTION ALGORITHMS FOR 3GPP NETWORK DATA ANALYTICS FUNCTION (NWDAF)

BACKGROUND

A 5G Core (5GC) architecture is the center of a 5G mobile network. 5GC can establish reliable, secure connectivity to the network for end users and provide access to various services. The core domain provides a wide variety of essential functions in the mobile network, such as connectivity, mobility management, authentication, subscriber data management, and others. In the 5GC architecture, each Network Function (NF) offers one or more services to other NFs via Application Programming Interfaces (API). Each NF is formed by a combination of small pieces of software code called microservices. Some microservices can be re-used for different NFs.

In a core network such as the 5GC, a Network Data Analytics Function (NWDAF) is used to collect data from User Equipment (UE), NFs, and Operations, Administration, and Maintenance (OAM) systems from the 5G Core, Cloud, and Edge networks. Among the uses of this data is analytics. The NWDAF utilizes standard interfaces from the service-based architecture to collect data from various NFs by subscription or request model. The NWDAF optimizes performance of the network by analyzing data from the network in order to improve features such as security, and enhance user experience at the User Equipment (UE), among other uses. The original NWDAF specifications were created by the $3^{rd}$ Generation Partnership Project (3GPP) in order to standardize how various NFs should interact with the core.

BRIEF DESCRIPTION OF THE DRAWINGS

The present disclosure, in accordance with one or more various examples, is described in detail with reference to the following figures. The figures are provided for purposes of illustration only and merely depict typical or examples.

The figures are not exhaustive and do not limit the present disclosure to the precise form disclosed.

DETAILED DESCRIPTION

Due to the 3GPP Network Data Analytics Function (NWDAF), services and performance can be automatically improved including at the User Equipment (UE) and the network level. However, various limitations exist with conventional techniques for utilizing the NWDAF. For example, some conventional techniques use the same forecasting algorithm for executing each workload prediction. This can result in a less optimal tradeoff between accuracy, latency, and resource consumption.

Examples of the present disclosure improve upon conventional techniques and execute 5G NWDAF uses cases, such as NF load, slice load and others, with a more optimal tradeoff between accuracy, latency, and resource consumption. One effect of this is to realize green solutions such as a lesser carbon footprint by way of, e.g., reducing processing or optimizing various functions to reduce resource consumption.

Examples of the present disclosure provide smart NWDAF prediction optimization that includes deconstructing a received 3GPP subscription request into a plurality of analysis tasks, creating at least one group of the analysis tasks based on common attributes of the analysis tasks (e.g. slice ID, NF ID), creating a single analysis prediction workload for each group of the analysis tasks, deriving a prediction time window from a prediction period contained in the 3GPP subscription request, categorizing each single analysis prediction workload by type in which each type has a same or similar prediction time window, and selecting a forecasting algorithm for executing each single analysis prediction workload based on whether the prediction time window is classified as immediate, short term, or long term.

In some examples the selecting process includes factoring in an accuracy metric as provided through a 3GPP Application Programming Interface (API). The accuracy metric could be, for example, a LOW or HIGH accuracy, or could be presented as a request or value that is then classified as falling into a LOW or HIGH accuracy. The accuracy metric can be an optional parameter, requested by subscription.

Different types of forecasting algorithms can be used in examples of the disclosed technology. Suitable forecasting algorithms can use various techniques to execute time series predictions using data from a past window to predict next values in a future period and for which the size of the input data windows has an impact on both accuracy and resource consumption. These techniques can be from the auto-regression family, e.g., auto-regressive integrated moving average (ARIMA) or equivalent, or can be neural-network based, e.g., Long Short-Term Memory (LSTM) or equivalent, or others; it is of course to be understood that examples or applications of the disclosed technology are not limited to the examples of forecasting algorithms provided herein.

Figure 6:
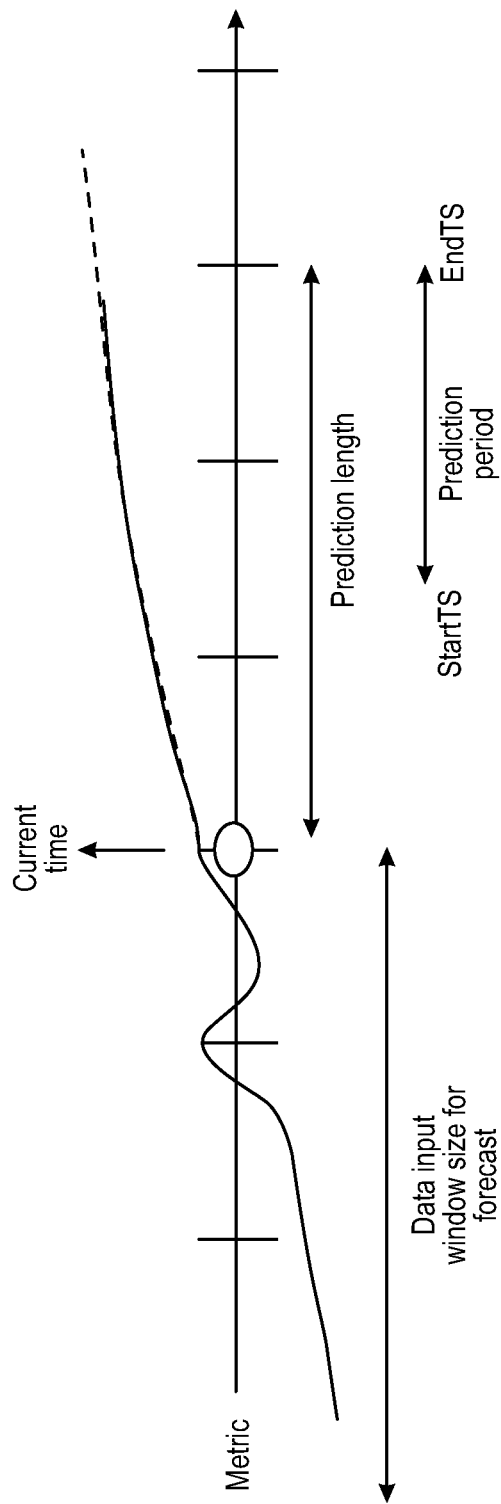
FIG. 6 is a timing graph that plots time vs. metric according to an example of the application.

It is noted that the subscription request can include the prediction period, also referred to herein as an observation period. This is the time window for which the subscription applies. From the timing graph in FIG. 6 it can be seen that the prediction period is defined as the time period between StartTS and EndTS. This is the run time of the algorithm being used to make the prediction. From the prediction period the prediction length can be derived. As shown in FIG. 6 the prediction length is defined as the length between the current time and EndTS. The prediction length is also referred to herein as the prediction time window.

In some examples when the prediction time window is classified as long term, the disclosure includes determining an optimal input data window size of the forecasting algorithm for the prediction time window (and accuracy if requested) using historical data from the results of previous predictions executed for the same type of analysis. In some examples this is done by training a Machine Learning model for this purpose based on algorithm performance estimates computed from historical prediction results based on the prediction time window and requested accuracy. The size of the input data window, or the amount of past data to use in the prediction, can be complex to estimate. A bigger size can take a longer time and use up more resources than smaller sizes. The model can recommend an optimal input data window size. Thus, the output of the model is the input data window size recommended for the next prediction, which determines the duration or run time of the algorithm used.

Techniques set forth in this disclosure can provide improved technical effects at for example the UE or network level, in the form of improved services or performance. The disclosure can address problems introduced by the NWDAF caused by a large number of entities and parameters dynamically requested from various consumer devices. Techniques set forth in this disclosure can better handle processing analyses for a high level of entities and parameters dynamically requested from various consumer devices. In some examples, requests received by the 3GPP NWDAF have a high level of commonality. Requests having a high level of commonality provides the ability to categorize subscriptions and assign analyses according to category. There are typically a constant series of requests with the same or similar attributes (e.g., slice ID, NF ID, metrics), and the same or similar prediction time windows, and where only the UE ID, and possibly the requested accuracy, is different. This is highly probable, as network function consumers of the NWDAF subscribe in a programmatic way using regular rules applied to subscriptions for each UE ID.

By virtue of the disclosed technology, tuning of the analyses can also be communalized and automatically enhanced based on historical data from its associated prediction runs. Moreover, the NWDAF is able to determine the accuracy of the prediction by continuously comparing the input data with the previously predicted results, i.e., the NWDAF is not relying on an external entity to inform as to how accurate the predictions have been.

It should be noted that the terms "optimize," "optimal" and the like as used herein can be used to mean making or achieving performance as effective or perfect as possible. However, as a person having ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

In some examples, the disclosed technology can be implemented in a cloud native environment (as 5G CORE is specified for a service-based architecture), so that the disclosed technology is implemented at the service level with for example Software as a Service (SaaS) or Platform as a Service (PaaS) acting as an abstraction layer with underlying hardware behind them. Thus, an NWDAF computing component, such as the NWDAF computing component 100 in FIG. 2, can be part of the NWDAF and can be executed on, for example a SaaS or PaaS, with underlying hardware components (such as those shown in FIG. 11) in a cloud-based environment. As other examples, the disclosed technology can also be implemented in a server computer, a controller, or in any other similar computing component capable of processing data.

Examples of the present disclosure are applicable, for example, to the NWDAF slice load use case mentioned above. Generally, in building communication networks, including next generation and 5G wireless networks, network slicing provides the ability to create isolated virtual networks on the same physical network infrastructure, where different traffic flows can travel as isolated traffic streams from other network slices. Network slicing in particular may enable the multiplexing of virtualized and independent traffic streams on the same physical network infrastructure. Each network slice may be an isolated end-to-end network tailored to fulfill diverse requirements required by different traffic types.

Accordingly, network slicing is a type of network architecture that enables network communication operators to deploy different configurations on the same network, for example, by implementing multiplexing of virtualized and independent logical networks on the same physical network infrastructure. Each network slice may correspond with an isolated end-to-end network tailored to fulfill diverse requirements requested by a particular application. As an illustrative example, a first network slice may transmit a large number of short transmissions to or from UE that do not need ultra-reliable connections. This network slice would differ in its configuration and resource demands from a network slice that is designed to serve the needs of a UE connecting to an enhanced broadband network. By providing slices with different network parameters and characteristics, services can be transmitted via slices that are designed to meet the needs of their traffic flows. Using multiple slices allow the network operator to ensure that the specific needs of a service are met without requiring the overprovisioning of resources for each UE and/or connection to the network with a single slice. When using multiple services provided by the communication network (e.g., 5G network, etc.), data transferred between the network operator and the UE may be transmitted using these network slices.

Figure 1A:
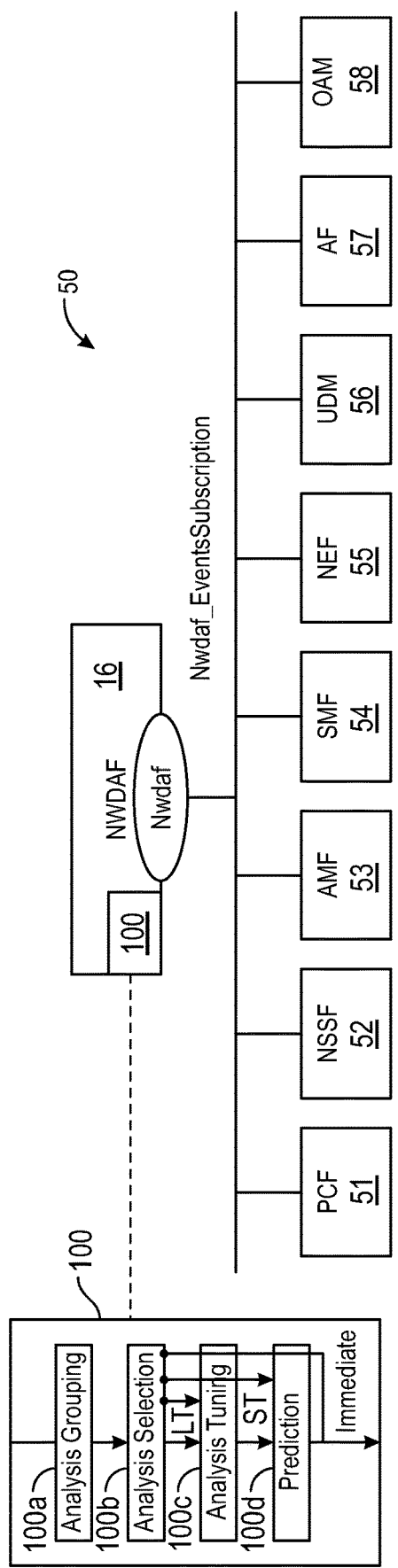
FIGS. 1A and 1B are block diagrams of example 5G communication network policy framework architectures with NWDAF usage, in accordance with examples of the application.
Figure 1B:
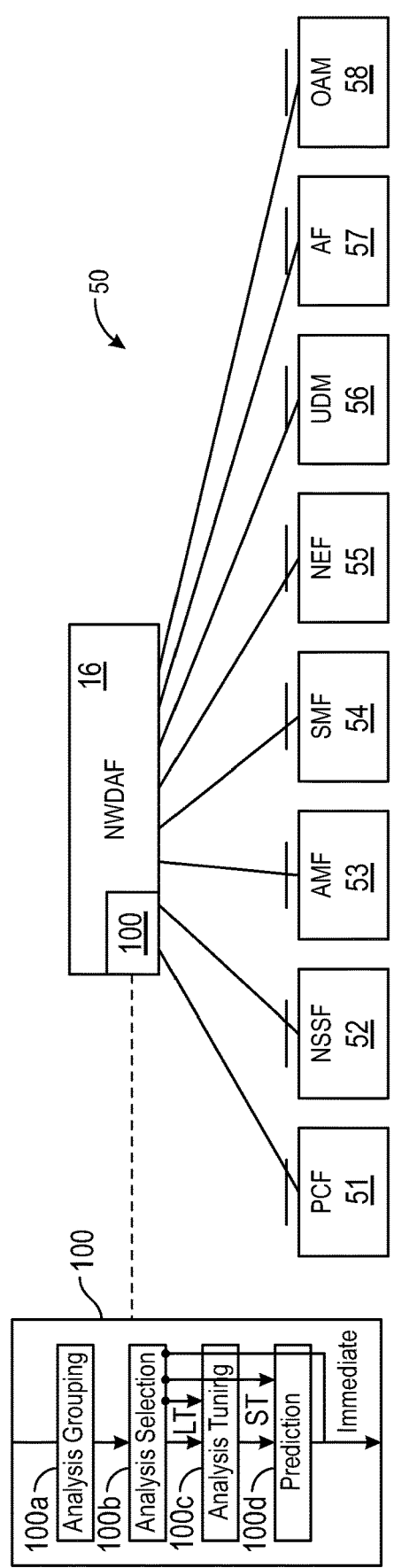

FIGS. 1A and 1B are block diagrams of example 5G network framework architectures with NWDAF usage, in accordance with examples of the application. More specifically, FIG. 1A is a reference architecture example for the NWDAF events subscription service, SBI representation (Service Based Interface). FIG. 1B is a reference architecture example for the NWDAF events subscription service, reference point representation. These representations of the overall non-roaming 5G network 50 are provided for illustrative purposes only, as any suitable communication network may be implemented in accordance with the examples described herein.

FIGS. 1A and 1B each include a Network Data Analytics Function (NWDAF) 16 which includes a NWDAF computing component 100 that can perform smart NWDAF prediction optimization according to examples of the present disclosure using techniques that may include grouping 100*a*, selection 100*b*, tuning 100*c*, and prediction 100*d*, as will be described in detail below. The operations performed by the communication network can be implemented by various functions, some of which are described herein. Other functions included are the Policy Control Function (PCF) 51, the Network Slice Selection Function (NSSF) 52, the access and mobility policy enforcement functionality supported by the Access and Mobility Management Function (AMF) 53, the Session Management Function (SMF) 54, the Network Exposure Function (NEF) 55, the Unified Data Management (UDM) function 56, the Application Function 57, and the Operations, Administration, and Maintenance function (OAM) 58. The AMF 53 and the SMF 54 are notable functions seen by consumers of NF load, and the NSSF 52 and the PCF 51 for slice load.

Other functions that may be included, although not shown in FIG. 1A or 1B, are the User Plane Function (UPF), the Charging Function (CHF), the Unified Data Repository (UDR), the Network Repository Function (NRF). UDM and NRF are used as NWDAF data sources for NF profiles and UE-related information required during the NWDAF processing. Of course, still other functions may be included as well.

These functions may enable operation of the 5G communication network. For example, the SMF may receive a session establishment request from the UE. The SMF selects the PCF and sends an HTTP POST request that provides, for example, the User Location Information, Serving Network, and charging information, among other data. The request operation may also include a Notification URI (Uniform Resource Locator) to indicate to the PCF where to send a notification when the SM-related policies are updated. The PCF may request notifications from the UDR on changes in the subscription information and the UDR can acknowledge the subscription from the PCF.

Figure 2:
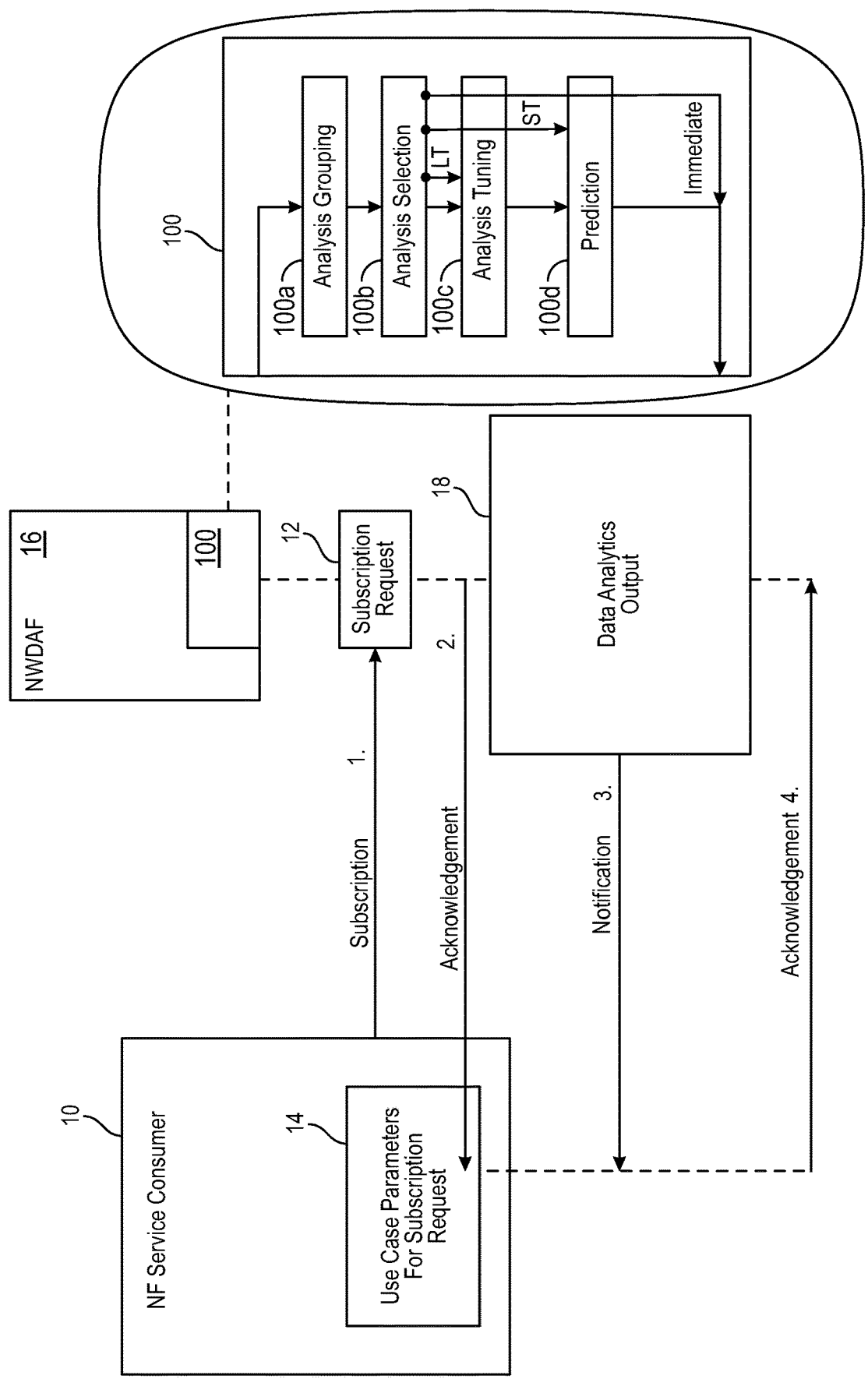
FIG. 2 illustrates an example sequence diagram for application of NWDAF prediction optimization for 3GPP use cases, in accordance with examples of the application.

FIG. 2 illustrates an example sequence diagram for application of NWDAF prediction optimization for 3GPP use cases, in accordance with examples of the application. NWDAF use cases include NF load, slice load, UE mobility for UE location and trajectory prediction, among others.

At 1 of FIG. 2, an NF service consumer device 10 sends a subscription request 12 having use case parameters set out in element 14 to NWDAF 16 of which the NWDAF computing component 100 is a part. At 2 the subscription request 14 is acknowledged by the NWDAF 16. The NWDAF computing component 100 can perform smart NWDAF prediction optimization according to examples of the present disclosure using techniques that may include grouping 100*a*, selection 100*b*, tuning 100*c*, and prediction 100*d*, as will be described in detail below. The data analytics and result of the prediction are output by the NWDAF computing component 100 to element 18. This output can be used by the NWDAF 16 for its own processing, to realize and implement technical effects and improvements at for example the UE or network level. At 3 the NF service consumer device 10 is notified of the data analytics output by the NWDAF 16. At 4 the NF service consumer device 10 sends an acknowledgement to the NWDAF 16.

As a non-limiting NF load example, the AMF/SMF can use a prediction of NF load to decide on which NF to regulate traffic or assign a UE. When the UE receives a new subscription request, the AMF decides which SMF can support this UE and depending on the predictive load of the SMF decides which SMF to use to preferably assign a new UE. In this way traffic can be balanced using predictive balancing.

As one non-limiting slice load example, the AMF can ask the NSSF if no slice ID (SNSSAI) is already assigned to this UE. The NSSF uses slice load information from the NWDAF to select the slice ID and propose it to the AMF. In this way a certain slice can be assigned to a UE. Technical effects can be realized such as faster processing.

In a specific use case example of 3GPP TS 23.288 NWDAF slice load according to an example of the application, use case parameters for a subscription request as set out in element 14 include the following: event identifier, event reporting information (periodic, one time . . . ), load level thresholds, identification of network slice (SNSSAI), matching direction for the threshold, StartTS/EndTS. The data analytics output in element 18 for this use case is: event identifier, identification of network slice (SNSSAI), slice load usage, confidence. "TS" refers to time stamp.

In a specific use case example of 3GPP TS 23.288 NWDAF NF load according to an example of the application, use case parameters for a subscription request as set out in element 14 include the following: event identifier, event reporting information, NF load levels thresholds, all or selected target UEs, NF IDs (optional), identification of network slices (SNSSAI), matching direction for the threshold, StartTS/EndTS. The data analytics output in element 18 for this use case is: event identifier, type of NF instance, NF ID, NF status (NF CPU usage, NF memory usage, NF storage usage, NF load level average), SNSSAI, confidence.

Figure 3:
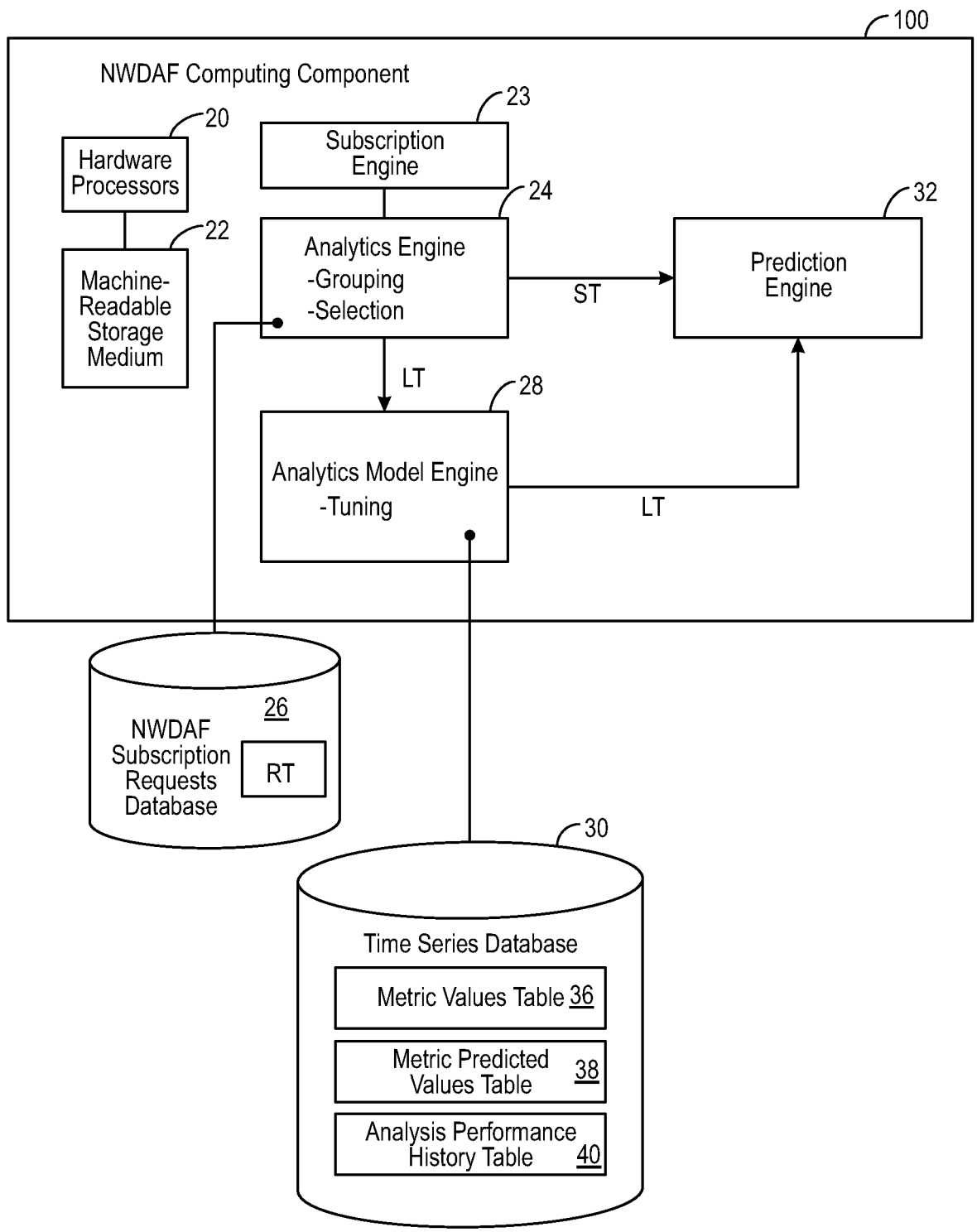
FIG. 3 Is a block diagram illustrating an example computing component for carrying out processes including grouping, selection, tuning, and prediction, in accordance with examples of the application.

FIG. 3 is a block diagram illustrating an example computing component 100, such as an NWDAF computing component 100, for carrying out processes including grouping, selection, tuning, and prediction, in accordance with examples of the application. As noted above the computing component 100 may be, for example, part of the NWDAF, implemented in a cloud-based environment such as Saas/PaaS using underlying hardware components, a server computer, a controller, or any other similar computing component capable of processing data. In the example implementation of FIG. 3, the computing component 100 includes one or more hardware processors 20 and machine-readable storage medium 22.

Hardware processor 20 may be one or more central processing units (CPUs), semiconductor-based microprocessors, and/or other hardware devices suitable for retrieval and execution of instructions stored in machine-readable storage medium 22. Hardware processor 20 may fetch, decode, and execute instructions for performing methods in accordance with the disclosure, to control processes or operations for optimizing the system during run-time. As an alternative or in addition to retrieving and executing instructions, hardware processor 20 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 22, may be any electronic, magnetic, optical, or other physical storage device that contains or stores executable instructions. Thus, machine-readable storage medium 22 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 22 may be a non-transitory storage medium, where the term "non-transitory" does not encompass transitory propagating signals. As described in detail below, machine-readable storage medium 22 may be encoded with executable instructions, for example, instructions for performing methods in accordance with the disclosure.

In FIG. 3, a subscription engine 23 receives subscription requests from a 3GPP NF consumer at the UE or NF level, and an analytics engine 24 performs functions including grouping and selection, as described below. The analytics engine 24 accesses a NWDAF subscription registry database 26. An analytics model engine 28 performs a tuning function when the prediction time window is classified as long term, as also described below. The analytics model engine 28 accesses a time series database 30 that may include a metric values table 36, a metric predicted values table 38, and an analysis performance history table 40, as described further below. The NWDAF computing component 100 also includes a prediction engine 32 for executing a prediction step.

Figure 4:
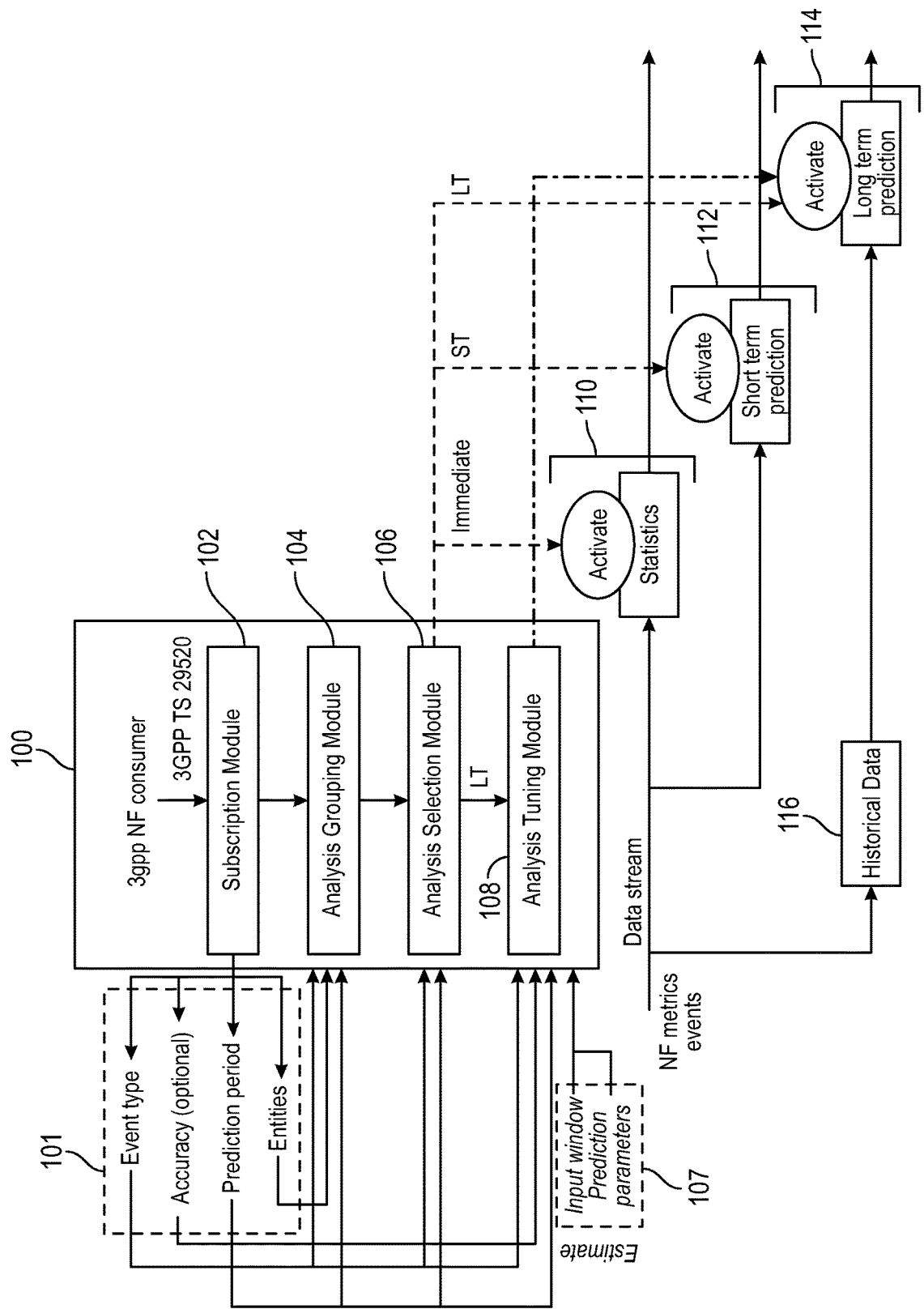
FIG. 4 is a diagram of a computing component, the diagram illustrating an overall sequence flow of subscription, grouping, selection, tuning, and prediction processes performed by the computing component, in accordance with examples of the application.

FIG. 4 is a diagram of an NWDAF computing component 100 also showing an overall streaming flow of subscription, grouping, selection, tuning, and analysis/prediction processes performed by the NWDAF computing component 100, according to examples of the present application. As shown in the example therein, three types of analyses or predictions can be performed by the NWDAF computing component 100, i.e., immediate (also referred to as "statistics"), short term, or long term, depending on the factors described below.

In more detail, in FIG. 4 the subscription module 102 of the computing component 100 receives a 3GPP subscription request 101 from a 3GPP NF consumer at the UE or NF ID level. The subscription request 101 can include an event type, a requested accuracy metric, a prediction period, and one or more entities (e.g., slice type, NF type, metric type). A prediction time window can be derived from the prediction period contained in the subscription request 101.

The analysis grouping module 104 deconstructs a received 3GPP subscription request into a plurality of analysis tasks, creating at least one group of the analysis tasks based on common entities of the analysis tasks. The analysis grouping module 104 creates a single analysis prediction workload for each group of the analysis tasks, categorizing each single analysis prediction workload by type in which each type has a same or similar prediction time window, and selects a forecasting algorithm for executing each single analysis prediction workload based on whether the prediction time window is classified as immediate, short term, or long term, as will be further described in connection with FIG. 5 below.

If the prediction time window is immediate (also referred to as "statistics"), no forecasting algorithm is applied and current metric data is used as in 110. If the prediction time window is short term, the single analysis prediction workload is executed in a streaming process with an algorithm requesting a low amount of data for predicting in the short term as in 112. If in another case the requested accuracy is HIGH, then long term prediction is activated instead as in 114. When the prediction time window is long term, the analysis tuning module 108 trains a machine learning model to determine an optimal input data window size or other input window prediction parameters 107 of the forecasting algorithm for the prediction time window, using historical data 116 from results of one or more previous predictions executed for the same type of analysis identified with common entities.

Figure 5:
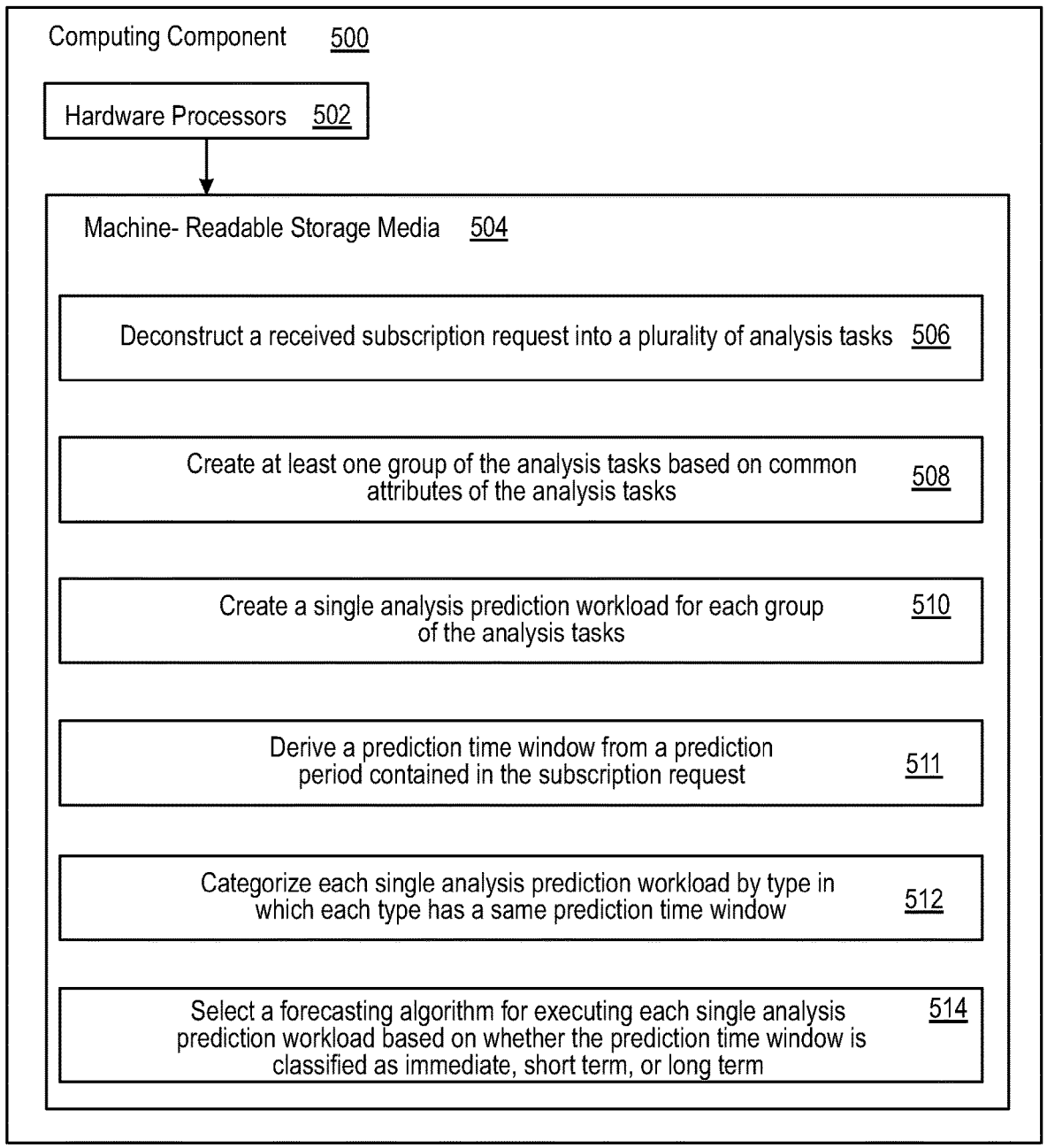
FIG. 5 is a block diagram illustrating an example computing component for providing grouping and selection instructions, in accordance with examples of the application.

FIG. 5 is a block diagram illustrating an example computing component for providing grouping and selection instructions, in accordance with examples of the application. The computing component 500 may be, for example, the computing component 100 of FIGS. 1-4, part of the NWDAF 16 of FIG. 1 or 2, implemented in a cloud-based environment such as SaaS/PaaS using underlying hardware components, a server computer, a controller, or any other similar computing component capable of processing data, including the analytics engine 24 or the NWDAF computing component 100. In the example implementation of FIG. 5, the computing component 500 includes a hardware processor 502 and machine-readable storage medium 504. Hardware processor 502 may be similar to hardware processor 20 described above, suitable for retrieval and execution of instructions stored in machine-readable storage medium 504. Hardware processor 502 may fetch, decode, and execute instructions, such as instructions 506-514, to control processes or operations for optimizing the system during run-time. Hardware processor 502 may be one or more central processing units (CPUs), semiconductor-based microprocessors, and/or other hardware devices suitable for retrieval and execution of instructions stored in machine-readable storage medium 504. Hardware processor 502 may be local or remote. As an alternative or in addition to retrieving and executing instructions, hardware processor 502 may include one or more electronic circuits that include electronic components for performing the functionality of one or more instructions, such as a field programmable gate array (FPGA), application specific integrated circuit (ASIC), or other electronic circuits. Hardware processor 504 may be, for example, one or more general purpose microprocessors. The performance of certain of the operations or processes may be distributed among computer systems or computers processors, not only residing within a single machine, but deployed across a number of machines. Machine-readable storage medium 504 may be similar to the machine-readable storage medium 22 described above, encoded with executable instructions, for example instructions 506-514.

The instructions 506-514 in FIG. 5 are performed after a 3GPP subscription request is received (such as by the subscription engine 23 of the NWDAF computing component 100 as part of the NWDAF) from a 3GPP NF consumer at the UE or NF ID level, e.g., 3GPP TS 29520. As noted above the subscription request can include a prediction period, also referred to herein as an observation period. This is the time window for which the subscription applies. From the timing graph in FIG. 6, it can be seen that the prediction period is defined as the time period between StartTS and EndTS. This is the run time of the algorithm being used to make the prediction. From the prediction period the prediction length can be derived. As shown in FIG. 6 the prediction length is defined as the length between the current time and EndTS. The prediction length is also referred to herein as the prediction time window.

Hardware processor 502 may execute instruction 506 to deconstruct a received 3GPP subscription request into a plurality of analysis tasks. Essentially the 3GPP subscription requests are decomposed into finer-grained analysis tasks. See FIG. 7 for examples of analysis tasks.

Hardware processor 502 may execute instruction 508 to create at least one group of the analysis tasks based on common attributes or parameters of the analysis tasks, in other words based on values of common entities. See again FIG. 7 for examples of groups of analysis tasks. The attributes or parameters or entities may include for example slice ID, NF ID, metric, etc. Creating at least one group of analysis tasks based on common attributes can have the technical effect of reducing duplicated prediction executions and reducing the NF consumption footprint. The NF IDs may be retrieved for example from the 3GPP NRF and UDM functions (based on the provided UE ID supi) if the NF IDs are not provided in the subscription request, as described further below in connection with the example of FIG. 7. The at least one group of analysis tasks and the attributes can be stored, e.g., in a rules table in the NWDAF subscription registry database 26. The subscription registry database 26 can include attributes such as subscription ID, slice ID, NF ID, metric, startTS, endTS, threshold, direction, requested accuracy, analysis ID, etc. These are of course non-limiting examples.

The hardware processor 502 may execute instruction 510 to create a single analysis prediction workload for each group of the analysis tasks. In some examples this instruction may include selecting the highest accuracy and prediction window size of each group of the analysis tasks. These parameters are received, for example, through the 3GPP service API at subscription. Grouping similar tasks form a single analysis prediction workload and can have the technical effect of reducing resource consumption.

The hardware processor 502 may execute instruction 511 to derive a predetermined time window from a prediction period contained in the 3GPP subscription request, as described further herein.

The hardware processor 502 may execute instruction 512 to categorize each single analysis prediction workload by assigning a type in which each type has the same prediction time window or recommended input data window size and prediction parameters. Categories can rely for example on combinations of type of metric, type of NF, or other attributes or parameters.

Figure 7:
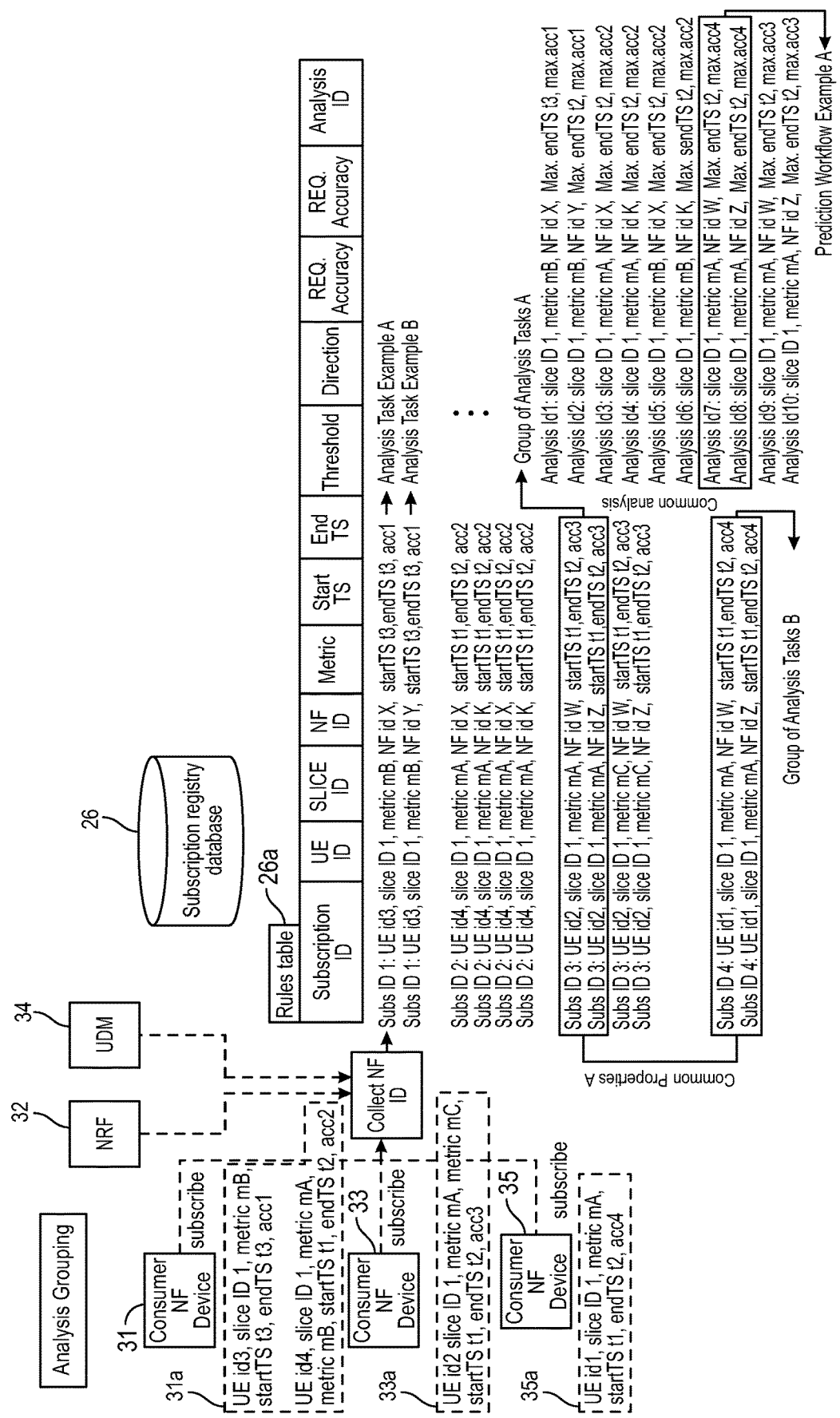
FIG. 7 illustrates an example grouping analysis performed by a computing component in accordance with examples of the application.

FIG. 7 illustrates an example of a grouping analysis performed by a computing component or analytics engine 24 of FIG. 3 in accordance with examples of the application. FIG. 7 shows consumer NF devices 31, 33, and 35, associated with respective subscription requests 31a, 33a, 35a. In particular, the schema shown in FIG. 7 shows analysis task examples and describes four subscriptions (labeled Subs ID 1, Subs ID 2, Subs ID 3, and Subs ID 4) to the NWDAF service with grouping analyses for two of them (Subs ID 3 and Subs ID 4).

NF IDs are collected at 37. It is noted that for each subscription associated with a respective consumer NF device 31, 33, 35, if the NF IDs are not provided in the subscription request, associated NF IDs are collected from NRF 32 and UDM 34. The list of subscriptions 31a, 33a, 35a are split and stored in the subscription registry database 26 by subscription ID. The subscription IDs are deconstructed into a plurality of analysis tasks (see, e.g., Analysis Task Example A and Analysis Task Example B). At least one group of the analysis tasks is created based on common properties of the analysis tasks (see, e.g., Group of Analysis Tasks A and Group of Analysis Tasks B).

When common properties (e.g., Common Properties A) are found between these spit subscription references, a common analysis is executed (see, e.g., Prediction Workflow Example A), thereby reducing the number of analyses that will be executed at runtime. For the common analyses, the maximum of requested accuracy is set as an attribute as is maximum EndTS.

Returning to FIG. 5, the hardware processor 502 may execute instruction 514 to select a forecasting algorithm for executing each single analysis prediction workload based on whether the prediction time window is defined as immediate ("statistics"), short term, or long term. In some examples, the selection is based on accuracy provided through the 3GPP API (see FIG. 4). In this disclosure "immediate" is defined as null or 0, "short term" is defined as below a threshold value, and "long term" is defined as at or above the threshold value. It is noted that some examples only consider the threshold value and thereby cover the cases in which above the threshold value is long term and below the threshold value is short term. The threshold value is a configuration parameter that is initially set at a default value and can be tuned or changed for example by a user. In an example the threshold value for selecting between short and long term is set by default to a proposed value and can be changed by the user based on the observed duration of long term prediction algorithm executions versus the requested prediction lengths. If the requested prediction length is for example one minute and the expected execution duration for delivering a prediction result using a long term algorithm is greater, the NWDAF circuit 100 should select short term prediction. In an example a recommended value of the threshold is set by default on the system based on a previously measured floor. Nevertheless in an example a mechanism to detect cases of prediction execution duration exceeding the requested prediction length is scheduled that will trigger a refinement of the threshold to prevent such cases in the next runs. For such purpose the execution duration of long term prediction is archived in a prediction run history table beside the requested prediction length. This history can be used to regularly refine the threshold accordingly.

The selection of forecast algorithms among immediate, short term, or long term prediction is based in some examples on 3GPP subscription properties, specifically the prediction period (StartTS to EndTS). See again the timing graph in FIG. 6. The prediction length, also known as prediction time window, may be derived from the prediction period (startTS, endTS) provided in the subscription request as compared with the current time on the system. Thus, the prediction length may be the period from the current time to the endTS (endTS minus current time). In some examples the forecast algorithms selection is also based on the requested accuracy (LOW, HIGH) properties provided through the API. The LOW and HIGH accuracy levels are the two values defined in the 3GPP standard and can be provided by the consumer NF. The accuracy level can be considered LOW when a request of prediction does not require a very accurate result for the applied use case so that the resources consumption for processing the prediction can be reduced. As an example, a forecast of metric for preventing an overload for a long term period can have a lower level of accuracy and thus consume less resources for its execution.

Executing no prediction: If the time window is immediate (i.e., null or StartTS=EndTS=0), no forecasting algorithm is applied and current metric data is directly sent to a next threshold detection analysis. This scenario, for example, aids in the situation in which a consumer does not want to wait for the time it would take to run a prediction.

Executing short term prediction: If the prediction time window is short term, defined as below a threshold value configured as the NF parameter (e.g., a short predetermined threshold value), and if a requested accuracy is present and the requested accuracy is LOW, the single analysis prediction workload is executed in a streaming process with an algorithm requesting a low amount of data for predicting in the short term at maximum prediction length (maximum endTS minus current time) without considering the metric seasonality or period of repetition. If in another case a requested accuracy is present and the requested accuracy is HIGH, then long term prediction is executed instead. (It is noted that "short term" may be, e.g., the next few minutes, in one non-limiting example.) As an example, for a seasonality of one day and a prediction period of 6 hours, the amount of data can be two past days for a specific requested accuracy or metric trend.

A "low" amount of data used in a short term prediction can be an amount of data that is lower than that used in a long term prediction. A "high" amount of data used in a long term prediction can be an amount of data that is higher than that used in a short term prediction.

As a non-limiting example, a short term prediction can be used as a solution when no or a relatively small amount of historical data is available or a new or relatively new NF is involved. In this case enough historical data may not be available to execute a long term or more fine-tuned prediction. In an example if the necessary amount of historical data is not available compared to the selected input data window size, the NWDAF responds to the NF that a long term prediction is not possible as defined in the 3GPP specification.

Figure 9:
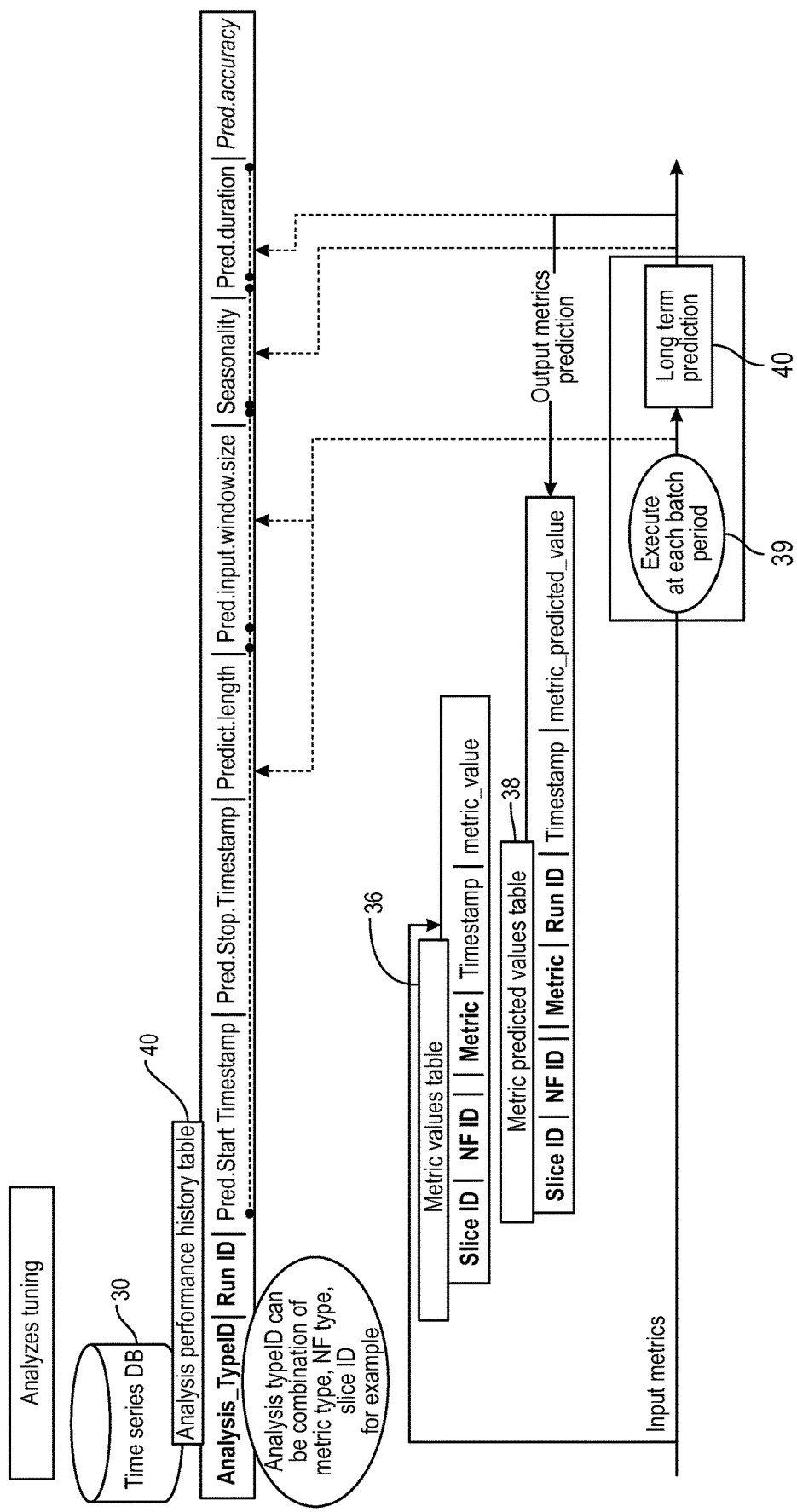
FIG. 9 illustrates a process flow for storing data in a tuning stage, in accordance with examples of the application.

Executing long term prediction: As shown in FIG. 9, if the prediction time window is long term, defined as at or above a threshold value configured as the NF parameter (e.g., a short predetermined threshold value), or is below this threshold but a requested accuracy is present that is HIGH, the single analysis prediction is executed in a batch process 39 (at each batch period) with an algorithm requesting a larger amount of data stored in a time series database 30 for predicting in a longer period by considering the data seasonality. At each batch execution 39 of a long term prediction 40, new observed metric values are stored in a table in the time series database 30 (e.g., in metric values table 36), and the result of the prediction for the prediction period is stored in another table in the time series database 30 (e.g., in metric predicted values table 38). Thus, it is noted that in some examples, statistics and short term prediction are executed accordingly in a streaming flow, whereas long term prediction is executed in batch instead, from time series data in a time series database 30. Executing a long term prediction can consume more time and resources than executing a short term prediction.

At each scheduled prediction run, each group of analysis tasks (i.e., common combinations of attributes or entities such as slice type, NF type, metric type) are detected in the rules table stored in the NWDAF subscription registry database 26. A single prediction is executed for each group of analysis tasks or type of combination. A technical effect of this can be to reduce the amount of prediction analyses, thereby avoiding duplication of processing when several subscriptions are related to the same entities. In an example, each single analysis prediction workload categorized by type may be executed using the selected forecasting algorithm.

Figure 8:
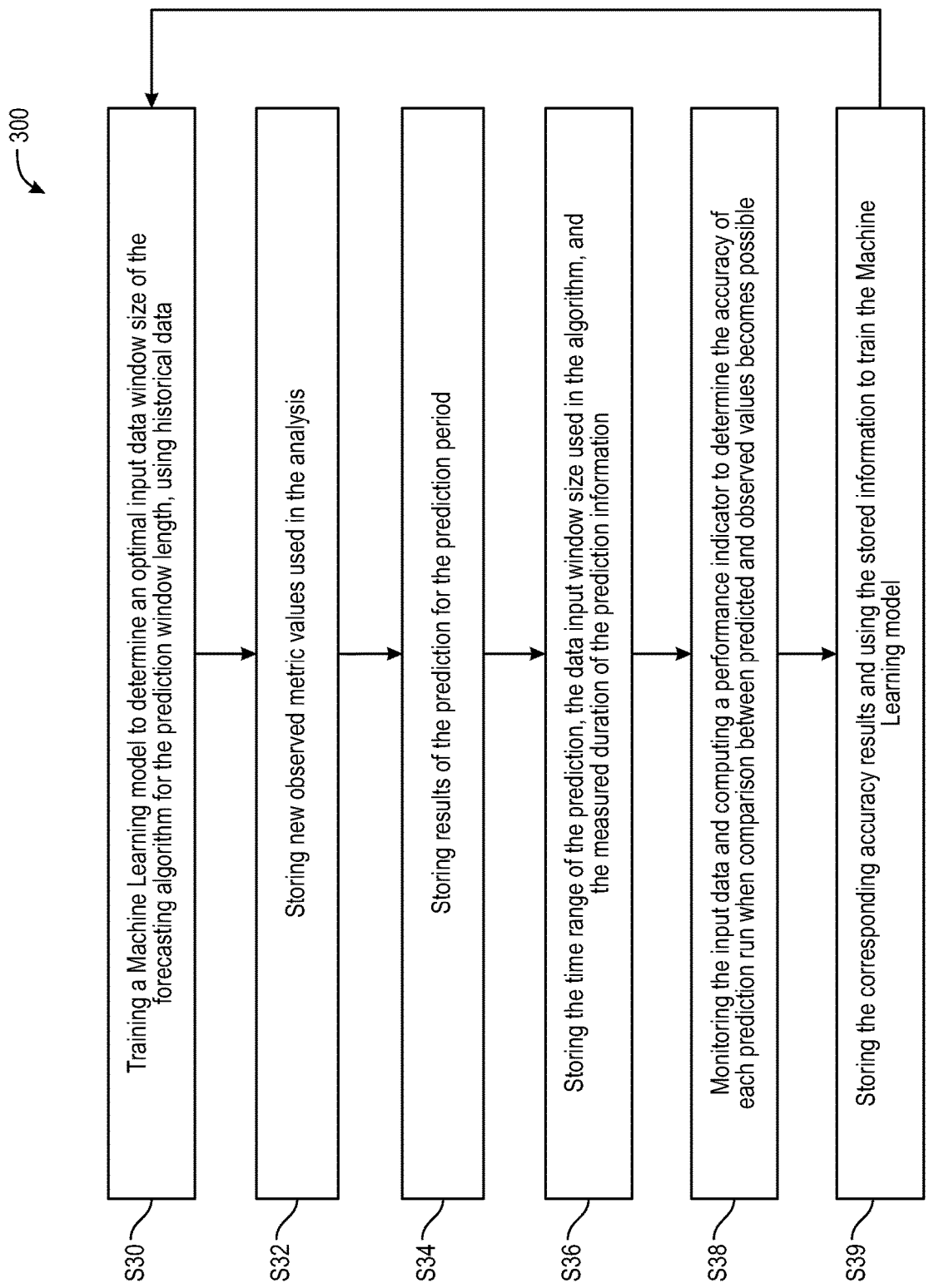
FIG. 8 is a flowchart illustrating a tuning method performed by an analytics model engine of a computing component, in accordance with examples of the application.

FIG. 8 is a flowchart illustrating a tuning process 300 performed, for example, by the analytics model engine 28 of the NWDAF computing component 100 shown in FIG. 3, according to examples of the application. At the outset it is noted that the tuning process described herein is only applicable for the long term prediction analysis.

Step S30 includes determining an optimal input data window size, and optionally other prediction parameters, of the forecasting algorithm for the prediction window length or prediction time window (derived from the requested prediction period) and accuracy if requested, using historical data from the results of previous prediction runs executed for the same type of analysis (e.g., same slice ID or NF ID and metric type). This is done by training a Machine Learning model for this purpose based on algorithm performance estimates such as input data window size or other convergence/prediction parameters, computed from historical prediction results based on the prediction time window and, if present, the requested accuracy.

The model may be trained periodically. To increase efficiency, the prediction length can vary for each subscription and each prediction run. In some examples, variation of the input data in the history table used to train the model (in terms of prediction length and accuracy if present) is likely; as such the training can converge to a relevant model. By virtue of the features set out herein, it can be possible, in at least some prediction runs, to use the smallest amount of historical data in order to shorten the training time and reduce resource consumption while meeting requested accuracy levels. Accordingly, one notable tuning factor that can impact the accuracy, execution duration, and footprint of a prediction analysis is the window size of the input data that is used for training the model.

Step S32 is discussed herein in conjunction with FIG. 9 which illustrates the process flow for storing data in the tuning stage according to an example. Step S32 includes, at each batch execution of a long term prediction, storing new observed metric values, attributes, or parameters used in the analysis, in the metric values table 36 in the time series database 30.

Step S34 includes storing the results of the prediction for the prediction period in another table in the time series database 30, e.g., the metric predicted values table 38, and archived for each prediction run, so as to be able to evaluate next the performance for each prediction when evaluation becomes possible, i.e., when comparison between predicted and observed values becomes possible.

Step S36 includes, at the end of each prediction run, storing the prediction period or time range of the prediction (prediction start TS, prediction stop TS), the input data window size used for the algorithm, and the measured duration or runtime of the prediction algorithm, in an analysis performance history table 40. Information stored in the analysis performance history table 40 can include the prediction period from the subscription request, the calculated input data window size, the analysis type, etc. The prediction execution duration is stored especially for the refinement process of the threshold between short and long-term prediction versus the requested prediction length. This process is scheduled to parse the analysis performance history table to detect cases of prediction execution exceeding the requested prediction length and compute a new threshold accordingly.

Step S38 includes monitoring the input data and computing a performance indicator to determine the accuracy of each prediction run when comparison between predicted and observed values becomes possible. This means that when the effective metric data is available and corresponds to a previous prediction run in terms of timestamp period, Step S38 computes an accuracy result of the prediction run, comparing the new observed data with the previously predicted data from the two time series tables, i.e., the metric values table 36 and the metric predicted values table 38. Thus, select values in the duration from the prediction start TS to the prediction stop TS from the two time series tables can be compared to each other to compute a performance indicator for each new Run ID when the predicted accuracy is null.

Step S39 includes adding the corresponding accuracy results to the analysis performance history table 40, for the prediction run associated with the analysis type, to complete its historical dataset. As a background task, the content of the analysis performance history table 40 is used to build the model to recommend the input data window size and other prediction parameters.

Figure 10:
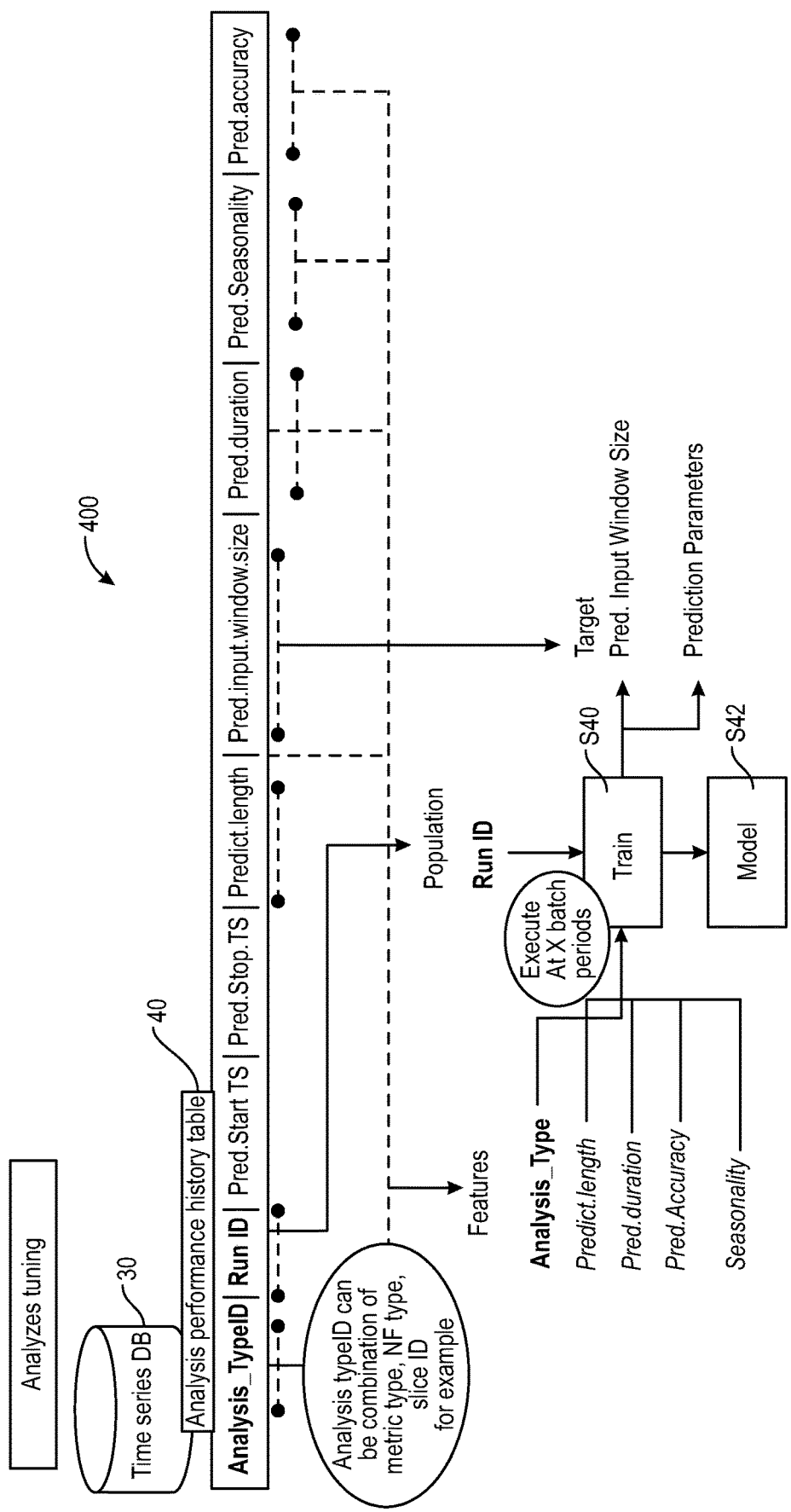
FIG. 10 illustrates a tuning method performed by an analytics model engine, in accordance with examples of the application.

In examples having a longer periodicity than the prediction scheduling, a tuning method 400 as shown in FIG. 10 is performed by, e.g., the analytics model engine 28 of the computing component 100 of FIG. 3. Step S40 includes training a model for each analysis type (e.g., prediction length, prediction duration or runtime of the prediction algorithm, prediction accuracy, seasonality). Step S42 includes building the dependency model between the prediction requirements and the input data window size that may optimally fit. At each prediction batch, if a model exists for the related entities (e.g., analysis type ID), an inference using this model is executed to obtain the estimated input data window size, which is then used for the long term prediction executed in the batch. If the model does not exist, the input data window size is computed from a formula based mainly on the prediction length and a default window size ratio available as an NF configurable parameter.

To effect a good variation of the values required for a model training coming next, in the case that no recommendation available (i.e., no existing model) and for a portion of prediction runs even when recommendation is available, a default window size is used and is generated using a pseudo random coefficient. The prediction input window size is a function of prediction length, default window size ratio, and the pseudo random coefficient. When a model exists, an inference using the model is used to obtain the estimated window size for a large percentage of prediction runs but for a portion of them the default size generated with the formula described above is used, thereby allowing more variation in the data for a later model retraining phase.

By virtue of the features of the present disclosure, the NWDAF can be regularly and dynamically configured by other network functions with real-time or near real-time notifications. Accordingly, the subscription, grouping into analyses, and selection of the input data window size and other prediction parameters based on analysis type can be executed in real-time or near real-time. Training of the model for the recommendation of the input data window size and other prediction parameters can be executed regularly but in some cases less frequently.

Figure 11:
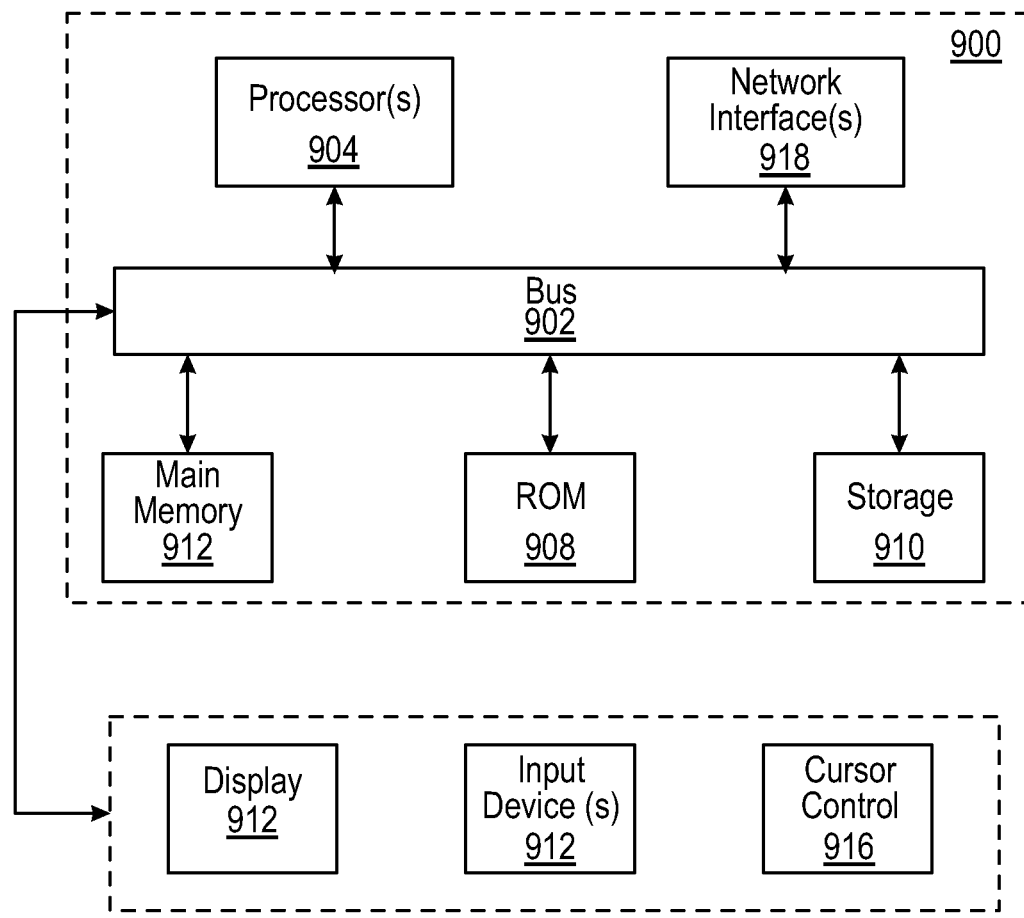
FIG. 11 is a block diagram of an example computing component that may be used to implement various features of examples described in the present disclosure.

FIG. 11 depicts a block diagram of an example computer system 900 in which various of the examples described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to a display 912, such as a liquid crystal display (LCD) (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. In some examples, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one example, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

The computer system 900 also includes a communication interface 918 coupled to bus 902. Communication interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicated with a WAN). Wireless links may also be implemented. In any such implementation, communication interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 918, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computing device, comprising:
a memory; and
a processor configured to execute machine readable instructions stored in the memory for performing a method comprising:
deconstructing a received subscription request into a plurality of analysis tasks;
creating at least one group of the analysis tasks based on common attributes of the analysis tasks;
creating a analysis prediction workload for each group of the analysis tasks;
deriving a prediction time window from a prediction period contained in the subscription request;
categorizing each single analysis prediction workload by type in which each type has a same prediction time window; and
selecting a short term or long term forecasting algorithm for executing each single analysis prediction workload based on whether the prediction time window is short term or long term, in which short term is defined as below a threshold value and long term is defined as at or above the threshold value;
wherein when the prediction time window is short term, executing the single analysis prediction workload with the selected forecasting algorithm requesting a lower amount of data for predicting in the short term than would be requested for predicting in the long term.

2. The computing device of claim 1, wherein when the prediction time window is null, no forecasting algorithm is selected and current metric data is directly sent to a next threshold detection analysis.

3. The computing device of claim 1, further comprising executing each single analysis prediction workload categorized by type using the selected forecasting algorithm.

4. The computing device of claim 1, wherein the selecting is also based on an accuracy metric provided through an Application Programming Interface (API).

5. The computing device of claim 1, wherein the common attributes include slice identifier or Network Function (NF) identifier.

6. The computing device of claim 1, further comprising, when the prediction time window is long term, training a machine learning model to determine an optimal input data window size of the forecasting algorithm for the prediction time window, using historical data from results of one or more previous predictions executed for the same type of analysis identified with common attributes.

7. The computing device of claim 4, further comprising, when the prediction time window is short term and the accuracy metric is LOW, executing the single analysis prediction workload with the selected forecasting algorithm requesting a lower amount of data for predicting in the short term than would be requested for predicting in the long term.

8. The computing device of claim 4, further comprising, when the prediction time window is short term and the accuracy metric is HIGH, executing the single analysis prediction workload with the selected forecasting algorithm requesting a higher amount of data for predicting in the long term than would be requested for predicting in the short term.

9. The computing device of claim 1, further comprising, when the prediction time window is short term, executing the selected forecasting algorithm in a streaming flow, and when the prediction time window is long term, executing the selected forecasting algorithm in batch from time series data, and
when the prediction time window is long term, storing, at each batch execution of a long term prediction, new observed metric values and metric predicted values in a time series database.

10. The computing device of claim 1, wherein the selected forecasting algorithm is one of auto-regressive integrated moving average (ARIMA) or long short-term memory (LSTM).

11. The computing device of claim 6, further comprising computing a performance indicator to determine an accuracy of each prediction run, storing the performance indicator, and training the machine learning model using the performance indicator.

12. A computer-implemented method for selection of a prediction algorithm for a Third Generation Partnership Project (3GPP) Network Data Analytics Function (NWDAF), the method comprising:
receiving a 3GPP subscription request from an API;
deconstructing the received 3GPP subscription request into a plurality of analysis tasks;
creating at least one group of the analysis tasks based on common attributes of the analysis tasks;
creating a single analysis prediction workload for each group of the analysis tasks;
deriving a prediction time window from a prediction period contained in the 3GPP subscription request;
categorizing each single analysis prediction workload by type in which each type has a same prediction time window; and
selecting a forecasting algorithm for executing each single analysis prediction workload based on whether the prediction time window is short term or long term, in which short term is defined as below a threshold value and long term is defined as at or above the threshold value;
wherein when the prediction time window is long term, using a trained machine learning model to determine an optimal input data window size of the forecasting algorithm for the prediction time window, wherein the machine learning model is trained using historical data from results of one or more previous predictions.

13. The method of claim 12, wherein when the prediction time window is null, no forecasting algorithm is selected and current metric data is directly sent to a next threshold detection analysis.

14. The method of claim 12, further comprising executing each single analysis prediction workload categorized by type using the selected forecasting algorithm.

15. The method of claim 12, wherein the selecting is also based on an accuracy metric provided through an application programming interface (API).

16. The method of claim 12, further comprising, when the prediction time window is short term, executing the selected forecasting algorithm in a streaming flow, and when the prediction time window is long term, executing the selected forecasting algorithm in batch from time series data, and
refining the threshold value used for selecting the short or long term prediction time window using historic data of prediction runs including archived data relating to the prediction time window and a prediction execution duration.

17. A computer system, comprising:
a memory; and
one or more processors that are configured to execute machine readable instructions stored in the memory for performing a method for selection of a prediction algorithm for a Third Generation Partnership Project (3GPP) Network Data Analytics Function (NWDAF), the method comprising:
deconstructing a received 3GPP subscription request into a plurality of analysis tasks;
creating at least one group of the analysis tasks based on common attributes of the analysis tasks;
creating a single analysis prediction workload for each group of the analysis tasks;
deriving a prediction time window from a prediction period contained in the 3GPP subscription request;
categorizing each single analysis prediction workload by type in which each type has a same prediction time window; and
selecting a forecasting algorithm for executing each single analysis prediction workload based on whether the prediction time window is short term or long term and based on a requested accuracy metric, in which short term is defined as below a threshold value and long term is defined as at or above the threshold value;
wherein when the prediction time window is long term, training a machine learning model to determine an optimal input data window size of the forecasting algorithm for the prediction time window, using historical data from results of one or more previous predictions.

18. The computer system of claim 17, wherein when the prediction time window is 0, no forecasting algorithm is selected and current metric data is directly sent to a next threshold detection analysis.

* * * * *